United States Patent [19]
Hala et al.

[11] Patent Number: 5,150,453
[45] Date of Patent: Sep. 22, 1992

[54] CAPTURE OF VECTOR CRT DISPLAY FOR HARDCOPY

[75] Inventors: Joseph A. Hala, Windsor Locks; Donald W. Johnson, Lebanon, both of Conn.

[73] Assignee: United States of America, Washington, D.C.

[21] Appl. No.: 667,717

[22] Filed: Mar. 11, 1991

[51] Int. Cl.[5] .............................................. G06K 15/00
[52] U.S. Cl. ..................................... 395/106; 395/114
[58] Field of Search ............... 395/100, 101, 106, 114; 235/432; 382/57, 21; 358/76, 141, 142, 401, 442

[56] References Cited

U.S. PATENT DOCUMENTS 4,510,619  4/1985  Le Brun .................................. 382/57
4,841,359  6/1989  Brinich .................................. 358/76

Primary Examiner—Arthur G. Evans

[57] ABSTRACT

A real-time data capture circuitry unit, which of a type commonly embodied as a printed wiring board assembly (or simply a "board"), has been designed to store the data used to create a current image on a Navy AN/UYQ-21(V) display. The data capture board receives the same symbol and acoustic data generator (ADG) data as the display. The data is captured and processed in real-time by duplicating the display information in a local display database. This local display database is constantly updated to be synchronous with the display so that an operator request for hardcopy processing of a current display results in a hardcopy of the display being viewed.

6 Claims, 2 Drawing Sheets

CAPTURE OF VECTOR CRT DISPLAY FOR HARDCOPY

STATEMENT OF GOVERNMENT INTEREST

The invention described herein may be manufactured and used by or for the Government of the United States of America for Governmental purposes without the payment of any royalties thereon or therefor.

BACKGROUND OF THE INVENTION

(1) Field of the Invention

The present invention generally relates to real-time data capture and more particularly to real-time capture of vector CRT display data for use in a real-time hardcopy processing system.

(2) Description of the Prior Art

The Navy requires accurate duplication of visual sonar acoustic and symbolic data displayed on AN-/UYQ-21(V) displays used in one of the AN/SQQ-28(V), AN/SQR-19(V), or AN/SQS-53X(V) sonar systems. The vector or sequential stroke displays such as that used by the AN/UYQ-21(V) display system utilize control circuitry to deflect the electron beam to draw symbols limited to a predefined set. The set of symbols may be a combination of alpha-numerics and custom symbols. To display a symbol, a control word is sent to the display which contains the X-Y coordinates indicating where the electron gun is to aim its electron beam. Another signal instructs the gun to increase or decrease the energy of the beam. The sequence of control words sent to the display will result in a picture on the CRT screen.

Previously, capture of data information used to create this type of display for use in a hardcopy processing system was achieved by post-processing of the data recorded on magnetic tape. This method requires capturing all of the data, storing it on magnetic tape for later retrieval, and post-processing to reproduce a hardcopy image. However, this method is impractical for real-time tactical use. An alternative to post-processing is to photographically reproduce the display; however, this results in poor image resolution.

SUMMARY OF THE INVENTION

Accordingly, it is an object of the present invention to provide a method and apparatus for real-time capture of vector CRT display data for use in a real-time hardcopy processing system.

Other objects and advantages of the present invention will become more apparent hereinafter in the specification and drawings.

In accordance with the objects of the present invention, acoustic display generator (ADG) and symbol data passed within an AN/UYQ-21(V) display are monitored by a real-time data capture circuitry unit, which is of a type commonly embodied as a printed wiring board assembly (or simply "board"). The ADG and symbol data are decoded, synchronized and converted from a serial data stream to a parallel data stream. A first-in, first-out (FIFO) random access memory (RAM) controller in combination with VME bus output circuitry processes the parallel data stream for real-time data capture.

DESCRIPTION OF THE PREFERRED EMBODIMENT(s)

Figure 1:
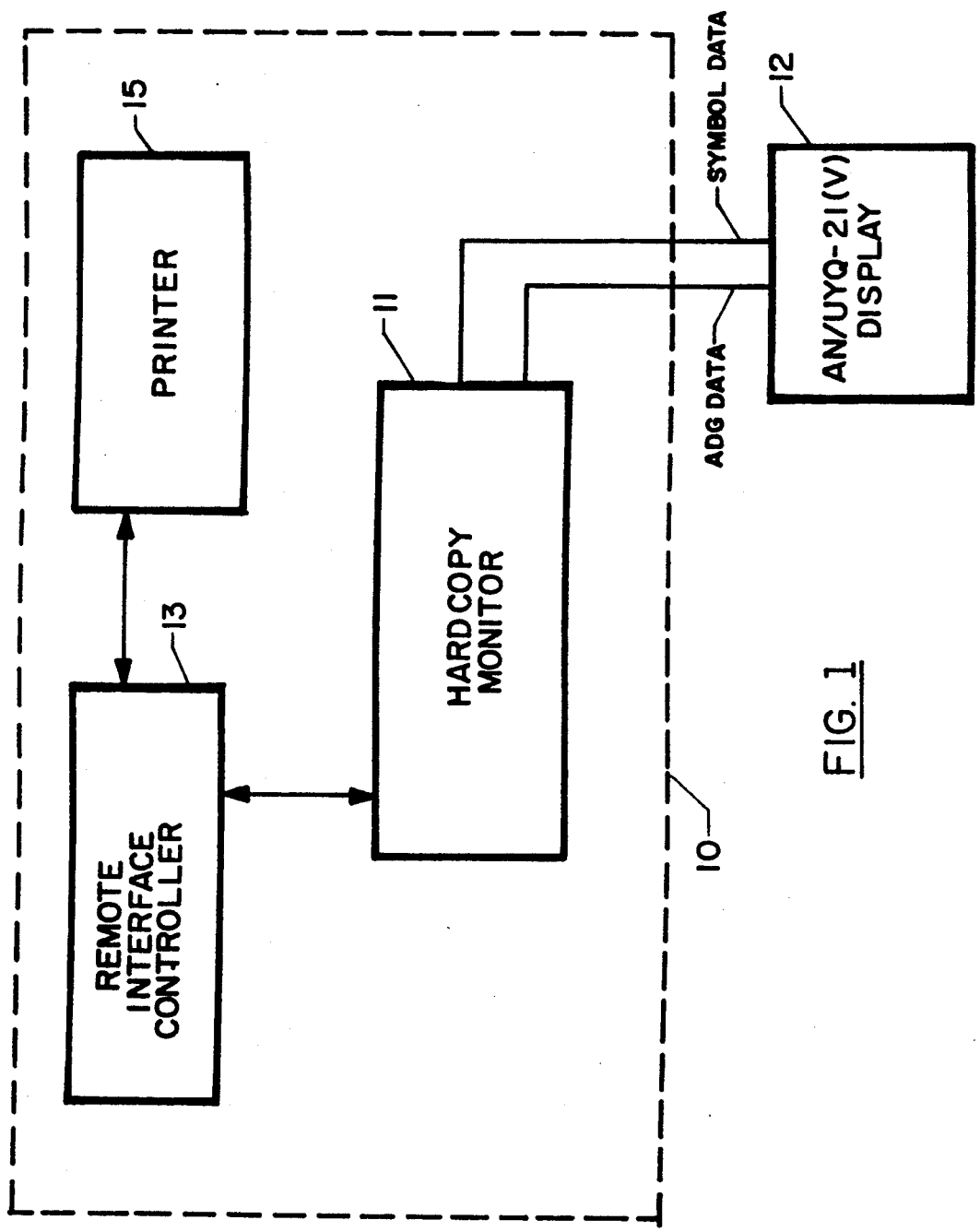
FIG. 1 is a schematic of real-time hardcopy processing system.

Referring now to the drawings, and in particular to FIG. 1, a real-time hardcopy processing system 10 is shown. A hardcopy monitor 11 monitors display data passed within an AN/UYQ-21(V) Navy display 12. By way of example only, the display data consists of acoustic display generator (ADG) data and symbol data. Up to eight channels of ADG and symbol data, and therefore eight different displays, can be monitored at one time. For sake of simplicity, the description will focus on the processing of ADG and symbol data from only one channel/display. Furthermore, the method and apparatus of the present invention are not limited to ADG and symbol data. Indeed, any display data can be used as input to the hardcopy processing system 10.

A remote interface controller 13 connected to the hardcopy monitor 11 provides the operator interface to initiate a printout of the AN/UYQ-21(V) display 12. Typically, the remote interface controller 13 would support selection of up to eight display surfaces. While multiple selection of display surfaces is allowed, a display image would be printed only when the previous display image had completed its output to the printer 15. The printer 15 generates a hardcopy output of the selected display surface and is typically a thermal printer.

Figure 2:
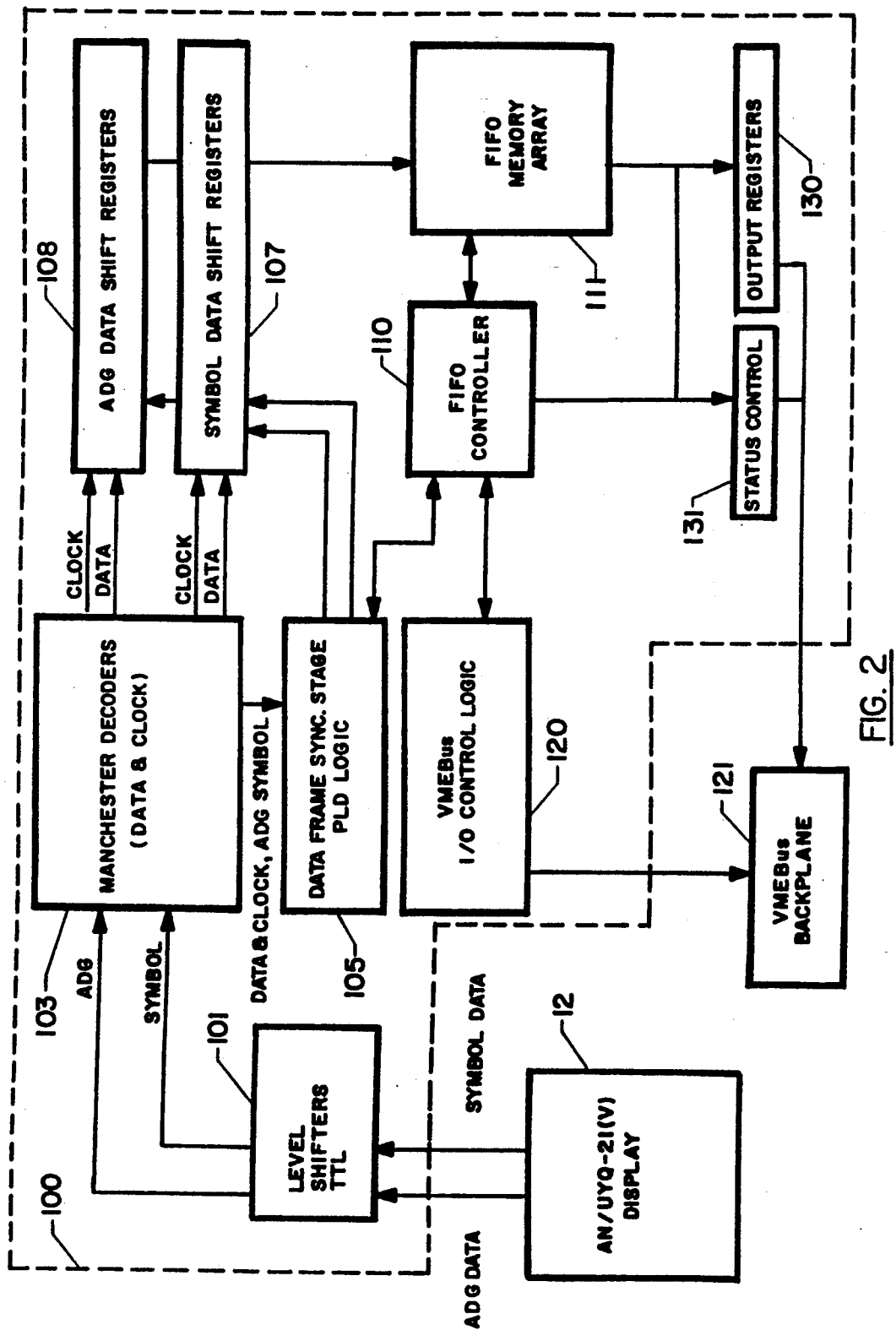
FIG. 2 is a block diagram of the real-time data capture board according to the present invention for use in a real-time hardcopy processing system.

Within the hardcopy monitor 11 is a real-time data capture circuiting unit 100, shown in block form in FIG. 2. Circuitry unit 100 is of a type commonly embodied as a printed wiring board assembly (or simply "board"). It shall hereinafter in this description be referred to as "board 100". The AN/UYQ-21(V) sends Manchester encoded, serial data via separate display multiplexer unit (DMU) channels for ADG and symbol data. Level shifter 101 converts the serial data into a transistor-transistor level (TTL) signal. The ADG and symbol data is then fed into a Manchester decoder 103 to decode the TTL signal into a clock signal and a data signal. The clock is used as a synchronization signal for data conversion from serial to parallel data. Both the clock and data signals are fed to a synchronization stage 105 to format data frames.

Synchronization stage 105 utilizes digital counters and programmable logic devices (PLD) encoded with logic equations to find the preamble of the data stream and synchronize the data stream. After frame synchronization is established, synchronization stage 105 provides the clock and data signals to shift registers 107 and 108 for the symbol and ADG data, respectively, and to first-in, first-out (FIFO) controller 110 to convert the serial data stream into a parallel data stream. The key elements of the data capture board 100 are the FIFO random access memory (RAM) controller 110 combined with the VME bus output circuitry 120. The FIFO RAM controller 110 may be any commercially available FIFO RAM controller. VME is a standard bus system sold by Motorola, Inc. The combination of these two provide an asynchronous system that achieves the unique speed of the data capture as described herein below.

The symbol and ADG channels are under control of two separate PLD's in the synchronization stage 105, one for each channel. Each performs exactly the same function. When these synchronization PLD's at synchronization stage 105 send a WRITE signal to the FIFO controller 110, either an ADG or symbol data frame (never both) is written to FIFO memory array 111. When the first data frame is written to FIFO memory 111, the FIFO controller 110 presents a flag signal to the VME bus output circuitry 120 indicating that a valid data frame is available. The VME bus output circuitry 120 performs a "pre-fetch" of that data frame by signaling the FIFO controller 110 with a READ instruction. The data frame is then taken from FIFO memory 111 and formatted into three output words and stored in output registers 130. The first output word is a control word. This word has bit fields that describe what type of data is present in the other two output words. The data is either described as an ADG word, a symbol word or an external function word. Separate bit fields in that control word describe the state of the system as either having the FIFO memory 111 full, empty or overflowed. The state of the system is stored in a status/control register 131 connected to both the FIFO Controller 110 and FIFO memory 111.

As is conventional and well known, the VME bus circuitry 120 then waits for a bus READ signal from an external microprocessor printed wiring board assembly, or simply "microprocessor board", connected to the data capture board 100 via the VME bus backplane 121. This action occurs simultaneous to the reading of new data frames from the AN/UYQ-21(V). When the external microprocessor board issues a READ request to the data capture board 100, the VME bus circuitry 120 puts the data onto the bus lines and issues a data transfer acknowledge signal. When all three output words have been read from output registers 130, the VME output bus circuitry 120 checks to see if more data is available from the FIFO memory 111. If data is available, the VME bus circuitry 120 issues another "pre-fetch" instruction to the FIFO controller 110 and repeats the process.

If the incoming data stream is not read at a proper rate, the FIFO memory 111 will overflow. This overflow signal will be relayed to the external microprocessor upon the next READ request of the status/control register 131. The external processor will issue a RESET instruction causing the data capture board 100 to clear its FIFO memory 111 and output registers 130, and then reestablish data frame synchronization at synchronization stage 105. If the data frames are found to be either out of sync or a collision of symbol and ADG words are found, the data capture board 100 will autonomously correct itself and resynchronize.

The FIFO RAM controller 110, VME bus circuitry 120, and FIFO memory 111 are clocked from timing circuitry separate from that used by the data synchronization circuitry 105. In particular, READ requests from the external microprocessor are typically clocked from a data capture board master clock synchronized with the external microprocessor. However, a WRITE to FIFO memory 111 is clocked from a clock within Manchester decoder 103. Accordingly, the FIFO controller 110 and memory 111 in conjunction with VME bus circuitry 120 make up an asynchronous system. That is, FIFO controller 110 and memory 111 will buffer or queue up incoming data at a slower rate than the external microprocessor via the VME bus circuitry 120 can read and process the data. Thus, the asynchronous circuit operation is not slowed or dead-locked with the incoming data thereby allowing a greater processing throughput.

Finally, processing algorithms present in the external microprocessor board, sort, manipulate and reformat the data taken from the data capture board 100 to create an exact image of the display surface of the AN/UYQ-21(V). The algorithms in the microprocessor determine the amount of data needed to recreate the current image of the display surface and dynamically update that image by continuously reading ADG and symbol frames from the data capture board 100.

The advantages of the present invention are numerous. By performing real-time data capture of display data from a current display, a real-time hardcopy processing system is made possible. The real-time data capture is passive and therefore requires no changes in the existing hardware or software and does not affect system performance. The system is also flexible to allow many types of printers to be used.

Stated somewhat differently to further disclose nuances of the invention, the AN/UYQ-21(V) Navy display 12 sends Manchester encoded, ECL level, serial data via separate display multiplexer (DMU) channels for ADG and symbol data to each display in the sonar system. The data capture board 100 of real-time hardcopy processing system 10 interfaces with these channels to receive the data.

ADG data is received from the AN/UYQ-21(V) Navy display 12 A-Port of the Central Data Buffer (CDB). This DMU-1 output data for ADG data is available at a connector. Symbol data is received from the AN/UYQ-21(V) Navy display 12 B-Port of the CDB. This is DMU-1 Output data for SYMBOL data available at a connector.

Triaxial cable is used at these connectors to bring the Manchester data onto the data capture board.

The level shifter 101, which includes clock generations and timing circuitry, converts the Emitter Coupled Logic (ECL) level logic signal into a Transistor-Transistor Level (TTL) signal. The data is fed into Manchester encoder 103 to decode the Manchester data into a clock signal and a data signal. The clock is used as a synchronization signal and a data signal. The clock is used as a synchronization signal for data conversion from serial to parallel data. Both the clock and data signals are fed to synchronization stage 105 to format data frames. This stage utilizes digital counters and Programmable Logic Devices (PLDs) encoded with logic equations to find the preamble and synchronize the data stream. After frame synchronization is established, the PLD provides the signals to shift registers and memory control devices to convert the serial data stream into a parallel data stream. Shift registers 107 and 108 depict the shift registers and memory control device along with the control signals required for operation. Since both ADG and Symbol data arrive on board 100, the data is multiplexed into the memory (interlaced). Reserved bit fields in the data frame distinguish one data type from another. These bit fields are later described.

The key elements of board 100 are the First In First Out (FIFO) RAM controller 110 combined with the bus output circuitry operatively associated with controller 100 and FIFO memory 111. The combination of these two stages account for the unique speed of the data capture.

The symbol and ADG channels are under control of two separate PLDs, one for each channel, each performs exactly the same function. When these synchronization PLDs send a write signal to the FIFO controller 110, either an ADG or SYMBOL data frame (never both) is allowed to be written to FIFO memory 111. When the first data frame is written to memory, the controller presents a flag signal to the VME bus output circuitry 120 indicating that a valid data frame is available. The VME bus output circuity performs a "prefetch" of that data frame by signalling the FIFO controller with a READ instruction. The data frame is then taken from memory and formatted into three (3) output words and stored in circuitry encompassed by registers 130 and 131. The first output word is a control word. This word has bit fields that describe what type of data is present in the other two output words. The data is either described as an ADG word, a SYMBOL word, or an EXTERNAL FUNCTION word. Separate bit fields in that control word describe the state of the system as either having the FIFO full, empty, or overflowed.

The VME bus control circuitry 120 then waits for a bus READ signal from an external microprocessor board. This action occurs simultaneous to the reading in of new data frames from the AN/UYQ-21(V) Navy display 12. When the external processor board issues a read request to the data capture board 100, the on-board slave VME bus circuitry puts the data onto the bus lines and issues a Data Transfer Acknowledge signal (DTACK). When all three output words have been read, the VME output circuitry 120 checks if more data is available from the FIFO. If data is available, the circuitry issues another prefetch instruction to the FIFO controller and repeats the process.

If the incoming data stream is not read at a proper rate, the FIFO will overflow. This overflow signal will be relayed to the external microprocessor board upon the next read request of the control register. The microprocessor board will issue a RESET instruction causing data capture board 100 to clear its FIFO memory 111 and output registers 130, then re-establish data frame synchronization.

If the data frames are found to be either out of sync, or a collision of SYMBOL and ADG words are found, the data capture board itself will autonomously correct itself and re-synchronize.

The FIFO RAM controller 110, VME bus control circuitry 120, and FIFO memory array 111 are clocked from timing circuitry separate (namely a clock within Manchester decoder 103) from that used by the data synchronization circuitry. This asynchronous circuit operation is necessary as to avoiding a lock-step operation which would lead to lost data at either the input or output.

Following is a brief description of what happens to the data once it leaves the data capture board 100. The intent is to clarify how the hardcopy processing system 10 creates and prints the display image on paper. Insofar as the invention is presently understood, the external microprocessor board, its processing algorithms, and the printer are not believed to be parts of the organization hereinafter claimed and have been disclosed for the purpose of such clarification.

Processing algorithms resident in the microprocessor board sort, manipulate and reformat the data taken from the data capture board 100 to create an exact image of the display surface of the AN/UYQ-21(V) Navy display 12. The algorithms in the microprocessor determine the amount of data needed to recreate the current image of the display surface and dynamically update that image by continuously reading ADG and SYMBOL data frames from the data capture board 100.

Throughout this processing, the remote interface controller 13 which resides in the sonar control room, communicates with the microprocessor board to determine the status of its processing. At a point in which a valid and complete representation of the display surface is formed, the remote interface controller 13 indicates on a Liquid Crystal Display (LCD) to the operator that the current image can be printed. The operator may elect to either print the image, or not, depending on whether the displayed data is needed to be printed. At any point, while the display is changing, the operator may elect to print the image. The operator instructs the hardcopy processing system 10 to print the current display via button action on the remote interface controller 13.

The remote interface controller 13 accepts the button action and relays the instruction to the external microprocessor board. The microprocessor board then sends the display data to the printer 15. The speed of the printing is dependent on the ability of the printer to accept and perform the print operation.

Throughout the printing process, the external microprocessor board continues to accept both data from the data capture board, and button actions for the operator. Multiple operator button operations are queued by the microprocessor board and serviced in the order received.

Valid button actions by the operator are PRINT commands, STATUS REQUEST commands to inform the operator the current state of the system, RESET command, POWER ON/OFF, and PRINT ABORT to cancel the current printing operation.

Features that make hardcopy processing system 10 unique and valuable are:

1. The hardcopy processing system is a passive system that requires no changes in operational software or hardware. It is a "direct connect" system that listens to the display data as it is being transmitted to the consoles. Hardcopy processing system 10 does not affect system timing or performance which is critical in any fleet operation. This feature alone eliminates costly and high risk alterations to existing sonar system's hardware and software.

2. The hardcopy processing system utilizes an industry standard VME Bus interface to allow many types of commercial or military, off the shelf computers to communicate with it.

3. The hardcopy processing system is flexible to allow many types of printers to be used, both commercial and military.

4. The hardcopy processing system is a non-critical subsystem that does not hinder the performance of the system connected to it. In case of failure, the hardcopy system will not affect in any way, the sonar systems to which it is attached.

5. The hardcopy processing system operates in real time allowing an exact duplicate of the displayed data to be printed on demand. The printer and control panel of the system resides in the sonar control room of guided missile cruises, guided missile frigates, and destroyers/- guided missile destroyers to allow immediate access of the paper display.

Alternative constructions of the hardcopy processing system 10 includes utilizing a bus interface other than VME Bus. (e.g., Multibus, NuBus, STD Bus etc . . . ). This alternative is possible by redesigning the bus interface.

Thus, it will be understood that various other changes in details, materials, steps and arrangement of parts, which have been herein described and illustrated in order to explain the nature of the invention, may be made by those skilled in the art within the principle and scope of the invention as expressed in the appended claims.

What is claimed is:

1. A data capture circuitry unit for real-time capture of vector CRT display data for use in a real-time hardcopy processing system in which data is captured in response to a read request signal initiated by an external microprocessor, said data capture circuity unit comprising:
   means for converting the data to transistor-transistor level (TTL) signals;
   a Manchester decoder having an internal clock for decoding said TTL signals into separate clock and data signals;
   means for converting said data signals into parallel data signals using said clock signal;
   local memory for storing said parallel data signals;
   means for accessing said local memory, said accessing means writing to said local memory in synchronization with said internal clock;
   means for receiving read requests from the aforesaid external processor, said receiving means being in communication with said accessing means and operable in synchronization with the aforesaid external processor to write said parallel data signals to said local memory asynchronously with respect to the external microprocessor; and
   a status/control register connected to said local memory and said accessing means for maintaining the status of said local memory as being in one of an empty, full or overflowed state, whereby said accessing means is prevented from writing to said local memory in one of said full or overflowed states.

2. A data capture board as in claim 1 wherein said means for converting to TTL signals is a level shifter.

3. A data capture board as in claim 1 wherein said local memory is a first-in, first-out (FIFO) memory array.

4. A data capture board as in Claim 1 wherein said accessing means comprises a first-in, first-out (FIFO) random access memory (RAM) controller.

5. A data capture board as in claim 1 wherein said receiving means is a VME bus.

6. A method of processing and storing data to perform real-time capture of vector CRT display data, said method having special utility in situations in which data capture is initiated by a read request from an external microprocessor, said method comprising the steps of:
   providing at least one channel of a serial data stream;
   converting said serial data stream into serial transistor-transistor level (TTL) signals;
   decoding said TTL signals into separate clock and serial data signals;
   converting said serial data signals into parallel data signals using said clock signal;
   writing said parallel data signals to storage in synchronization with said clock signal; and
   receiving requests to read the data in storage from an external microprocessor asynchronously with respect to said clock signal.

* * * * *